United States Patent
Nishina

[19]

[11] Patent Number: 5,969,809
[45] Date of Patent: Oct. 19, 1999

[54] LIGHT-MEASURING DEVICE FOR ACCURATE AND CONTINUOUS MEASUREMENT OF LIGHT INTENSITY

[75] Inventor: Shigeki Nishina, Tokyo, Japan

[73] Assignee: Advantest Corporation, Tokyo, Japan

[21] Appl. No.: 09/126,781

[22] Filed: Jul. 31, 1998

[30] Foreign Application Priority Data

| Aug. 4, 1997 | [JP] | Japan | 9-209264 |
| Aug. 5, 1997 | [JP] | Japan | 9-210824 |
| Apr. 23, 1998 | [JP] | Japan | 10-113663 |
| Apr. 27, 1998 | [JP] | Japan | 10-116893 |

[51] Int. Cl.$^6$ .................................................. G01J 1/40
[52] U.S. Cl. ........................ 356/233; 356/227; 356/232
[58] Field of Search .................... 356/233, 227, 356/232

[56] References Cited

U.S. PATENT DOCUMENTS 3,973,266  8/1976  Kakunodate et al. ............... 356/227
4,914,468  4/1990  Naruse et al. ...................... 356/227

*Primary Examiner*—Frank G. Font
*Assistant Examiner*—Reginald A. Ratliff
*Attorney, Agent, or Firm*—Oblon, Spivak, McClelland, Maier & Neustadt, P. C.

[57] ABSTRACT

A light-measuring device is disclosed for continuously and accurately measuring the intensity of light beams of from low intensity to high intensity. The intensity of a light beam to be measured is measured by a photodiode. A bias voltage is applied to the photodiode by a bias power source to improve the saturation characteristic. When the measured light beam is of high intensity, an analog switch and a photo MOS relay are switched on. When measuring a light beam with medium intensity, only the analog switch is turned off and a bias voltage is not applied to the photodiode. When measuring a light beam with low intensity, the bias voltage is not applied to the photodiode by switching off the photo MOS relay.

17 Claims, 13 Drawing Sheets

LIGHT-MEASURING DEVICE FOR ACCURATE AND CONTINUOUS MEASUREMENT OF LIGHT INTENSITY

BACKGROUND OF THE INVENTION

1. Field of the Invention

The present invention relates to a light-measuring device for measuring the intensity of light received using a means for detecting quantity of light, such as a photodiode.

2. Description of the Related Art

Conventionally, a light-measuring device such as an optical spectrum analyzer has been employed for the measurement of the amount of light of a light beam. FIG. 1 shows a block diagram of this type of light-measuring device of the prior art. This prior-art light-measuring device comprises a photodiode 2, a light detection circuit 23, an A/D converter 24, a computing unit 16, and a display 25.

Photodiode 2 receives the light to be measured and generates a signal that depends on the intensity of the light. Light detection circuit 23 amplifies the signal outputted by photodiode 2 at a fixed amplitude factor and outputs the result. A/D converter 24 performs A/D conversion of the signal outputted by light detection circuit 3 and outputs the result as measurement data. Computing unit 16 inputs the measurement data from A/D converter 24, carries out a process to convert the measurement data to data that can be displayed on display 25, and displays on display 25.

The light-measuring device of the prior art allows measurement of at various light intensities. The rated current that is allowed to flow through photodiode 2, however, is set, and flow of current greater than the rated current for more than a fixed time period results in breakdown of the photodiode.

In the light-measuring device of the prior art, therefore, the inadvertent incidence of light with intensity greater than the rated value for a period greater than the fixed period results in breakdown of photodiode 2.

As shown in FIG. 2, photodiode 2 has an output terminal connected to the grounded and an input terminal connected to the inverting input terminal of operational amplifier 3. The operational amplifier 3 has a non-inverting input terminal that is also grounded, and an output terminal that is fed back to be connected to the inverting input terminal via a feedback resistor 4.

In a light-measuring device of the above-described construction, photodiode 2 generates a signal depending on the amount of incident light when a light beam to be measured is supplied to photodiode 2. This signal is amplified and outputted by operational amplifier 3. This output allows measurement of the amount of light of the light beam.

However, the amount of light of the incident light beam varies from weak to strong, and as a result, if the gain of amplification by operational amplifier 3 is constant, then the range within which measurement can be effected will be limited.

To overcome this problem light-measuring device shown in FIG. 3 is known, in which feedback resistor 4 with variable resistance is provided, thereby expanding the range of measurement of the amount of light.

This light-measuring device of the prior art comprises an optical shutter 1, a photodiode 2, an amplifier 33, an A/D converter 24, a computing unit 16, a display 25, an operational amplifier 3, n resistors $8_1$–$8_n$ with differing resistances, and a switch 10.

Switch 10 consists of n switches $9_1$–$9_n$, whereby a specific resistor among resistors $8_1$–$8_n$ is connected to operational amplifier 3 by closing only the switch designated by gain switching signal 102.

Photodiode 2 converts the intensity of received light to a signal and outputs the result.

Operational amplifier 3 amplifies the signal from photodiode 2 based on the gain determined by the resistance of the resistor among resistors $8_1$–$8_n$ that is connected and outputs the result.

Computing unit 16 both controls the turn on (light admitting)/turn off (light blocking) of optical shutter 1 based on optical shutter control signal 101, switches the gain of operational amplifier 3 based on gain switching signals 102 such that the measurement data outputted from A/D converter 24 fall within a certain fixed range, and causes the measurement data from A/D converter 24 to be displayed on display 25.

The operation of the light-measuring device of the prior art will be explained below. Computing unit 16 first turns on optical shutter 1 based on optical shutter control signal 101 and begins measurement of light intensity. The measurement data of the light intensity are then supplied to computing unit 16 by way of operational amplifier 3, amplifier 33, and A/D converter 24.

If the inputted data do not fall within a certain fixed range, computing unit 16 switches the gain of operational amplifier 3 by controlling switches $9_1$–$9_n$ of switch 10 based on gain switching signals 102. At the time of switching this gain and for a fixed time interval afterwards, computing unit 16 turns off (light blocking) optical shutter 1 by means of optical shutter control signals 101 and measures the data delivered from A/D converter 24 during this time as the offset voltage of operational amplifier 3. The offset voltage is the voltage that appears in output at the operational amplifier when the input is zero.

Computing unit 16 then turns on optical shutter 1 based on optical shutter control signal 101, measures the light intensity, and subtracts the previously measured offset voltage from this measurement value and displays the resultant data on display 25 as the actual light intensity.

FIG. 4a shows a graph of the change in measurement data outputted from A/D converter 24 with respect to the measurement time, and FIG. 4b shows a graph of the change with respect to measurement time of data following subtraction of the offset voltage from the measurement data shown in FIG. 4a in computing unit 16.

In FIG. 4a, data measured during the time the optical shutter is turned off represent the offset voltage of operational amplifier 3, and the actual data as shown in FIG. 4b can be obtained by subtracting this offset voltage from the measurement data. The interval during which optical shutter is OFF is a display halt interval at display 25 because there are no measurement data to be displayed.

The amount of drift of an operational amplifier differs for each operational amplifier and in addition, varies with temperature. The offset voltage of the operational amplifier will therefore vary due to drift if there is a slight difference between the temperature of the operational amplifier at the time of measuring the offset voltage and the temperature of the operational amplifier at the time of measuring the actual light intensity, with the result that error is introduced in the measurement data.

Explanation will be next presented regarding measurement data in the case of drift of this offset voltage using FIG. 5a and FIG. 5b.

As shown in FIG. 5a, the amount of offset drifts during the interval that the optical shutter is turned off, and an average value is measured during this interval. The average value of this offset voltage is then subtracted from the measurement data of FIG. 5a to obtain the data shown in FIG. 5b. However, the obtained data inevitably includes error because the offset voltage drifts even after measuring the offset voltage.

Temperature drift in the offset voltage of the operational amplifier stops changing after a set time interval. An offset voltage value in which the effect of drift is eliminated can therefore be obtained if the offset voltage is measured after lengthening the time the shutter is turned off and drift stabilizes. Since measurement must be halted during the time interval, however, display on. display 25 must also be suspended.

In addition, the prior-art light-measuring device shown in FIG. 3 expands the measurement range of the amount of light because the gain of operational amplifier 3 can be changed. The drift of operational amplifier 3 also increases when the amount of light in a light beam with high intensity is measured because the output voltage increases and temperature rises, and measurement accuracy is therefore diminished if the amount of light in a light beam with low intensity is measured after measuring a light beam with high intensity.

Moreover, although the signal generated by the aforementioned photodiode is substantially directly proportional to the amount of incident light, some photodiodes exhibit a characteristic such that the generated signal is saturated when the photodiode is irradiated by a large amount of light. In a light-measuring device utilizing a photodiode with the saturation characteristic, the saturation characteristic can usually be improved by applying to the photodiode a bias voltage with opposite polarity to the generated current.

A light-measuring device that uses photodiode 12 having the aforementioned saturation characteristic will be next described with reference to FIG. 6.

In contrast to the light-measuring device of FIG. 2, this light-measuring device employs photodiode 12 having a saturation characteristic in place of photodiode 2, and in addition, is provided with bias power source 14 between the ground and output terminal of photodiode 12 for applying a reverse bias to photodiode 12 by way of resistor 13.

In the above-described light-measuring device, the application of a bias voltage with a polarity opposite to that of the generated current in photodiode 12 by bias power source 14 allows an improvement in the saturation characteristic of photodiode 12, which generates a current corresponding to the amount of light in a light beam.

In addition, the current generated by a photodiode not having this type of saturation characteristic is substantially directly proportional to the amount of light, and the photodiode is therefore energized to the output limit of operational amplifier 3 when the amount of light is excessive.

The photodiode is energized by an excessive current that surpasses the permissible rated current when the amount of light is excessive, and the photodiode is therefore subject to breakdown. When the current generated by photodiode 12 increases in the light-measuring device of FIG. 6, however, the voltage generated across resistor 13 also increases, whereby the bias voltage applied to photodiode 12 decreases and the saturation characteristic of photodiode 12, which had been suppressed, becomes conspicuous. The current flowing through photodiode 12 is then obstructed due to this saturation characteristic, with the result that the flow of excessive current through photodiode 12 can be suppressed.

The linearity of measurement of the amount of light decreases as this type of saturation characteristic becomes conspicuous, and the measurement accuracy of the amount of light therefore worsens as the amount of light increases.

In addition, when the light beam is of low intensity, the bias voltage of bias power source 14 gives rise to a dark current of photodiode 12, thereby creating an offset in the output result and degrading the measurement accuracy.

For this reason, in the light-measuring device shown in FIG. 7, relay 17 is provided between bias power source 14 and photodiode 12, so as to allow switching of the application of bias voltage.

Relay 17 allows the connection of the output terminal of photodiode 12 to either bias power source 14 or ground terminal 15.

Namely, in this light-measuring device, relay 17 allows connection of the output terminal of photodiode 12 is connected to ground terminal 15 when measuring a light beam with low intensity, thereby preventing the occurrence of offset voltage due to dark current in the output results.

However, relay 17 requires time for switching connections, and the above-described light-measuring device therefore encounters difficulties when continuously measuring light beams of from high intensity to low intensity. An analog switch can be considered for effecting this switching of connections, but an analog switch generates a large leakage current and therefore complicates accurate measurement when measuring the amount of light at low intensities.

SUMMARY OF THE INVENTION

It is an object of the present invention to provide a light-measuring device in which a means for detecting the amount of light such as a photodiode is not damaged by the input of a light beam with a large amount of light.

It is another object of the present invention to provide a light-measuring device that reduces the effect of drift in offset voltage of an operational amplifier without lengthening the measurement time of the offset voltage, thereby enabling measurement data of high accuracy.

It is yet another object of the present invention to provide a light-measuring device that can continuously and accurately measure light beams from low intensity to high intensity.

To achieve the above-described objects, the light-measuring device of the present invention blocks the light inputted to the light quantity detecting means by means of an optical shutter when the intensity of a light beam to be measured exceeds the rated value of a light quantity detecting means. Accordingly, breakdown of the light quantity detecting means is prevented because a light beam with intensity that exceeds the rated value is not inputted to the light quantity detecting means for a time interval greater than a set time.

In one embodiment, the optical shutter in another light-measuring device of the present invention blocks the input of light to the light quantity detecting means when the power source of the light-measuring device is in an off state. Accordingly, the light quantity detecting means can be protected when the power source is in an off state and the light-measuring device is not operating.

In another light-measuring device of the present invention, moreover, a computing unit measures the conversion factor of the offset voltage of the operational amplifier, produces an approximation equation that approximates the change over time of the offset voltage based on this conversion factor, subtracts from measurement data the offset voltage that is calculated by means of the approximation equation, and makes the result the new measurement data, thereby enabling a reduction of the error contained in measurement data.

In one embodiment of the present invention, a linear function can be used as the approximation equation.

In another embodiment of the present invention, an exponential function can be used as the approximation equation.

Another light-measuring device of the present invention includes a bias power source for impressing to a photodiode a bias voltage of opposite polarity to that of the current generated by the photodiode for the purpose of improving the saturation characteristic. This light-measuring device further includes a diode protection circuit which limits the bias voltage impressed to the photodiode from the bias power source when the energizing current of the photodiode reaches a limit current and controls the current energizing the photodiode to or below a limit current that is set in advance.

The current energizing the photodiode accordingly does not exceed a limit current and breakdown of the photodiode is prevented.

In addition, in another light-measuring device of the present invention, bias voltage from a bias power source is impressed to a photodiode by way of a first switching means and a second switching means. The first switching means and the second switching means are placed in an ON state when the light beam to be measured is of high intensity. When the light beam to be measured is of medium intensity, only the first switching means is placed in an OFF state and bias voltage is not impressed to the photodiode. When the light beam to be measured is of low intensity, the second switching means is placed in an OFF state, whereby bias voltage is not impressed to the photodiode.

The first switching means is capable of high-speed switching but has a large leakage current. The second switching means has less leakage current than the first switching means but has a slow switching speed. Accordingly, light beams from low intensity to high intensity can be accurately and continuously measured.

Further, according to another light-measuring device of the present invention, the first switching means and second switching means ground the photodiode when placing the bias power source and photodiode in a disconnected state. The bias voltage of the photodiode can thus be reliably set to "0," thereby allowing higher accuracy of measurement of light beam intensity.

In one embodiment of the present invention, the first switching means is an analog switch and the second switching means is a photo MOS relay.

In another embodiment of the present invention, the first switching means is an analog switch and the second switching means is a mechanical relay.

In another embodiment of the present invention, the first switching means is a photo MOS relay and the second switching means is a mechanical relay.

Finally, another light-measuring device of the present invention is separately provided with a first operational amplifier for measuring light beams of high intensity and medium intensity and a second operational amplifier for measuring light beams of low intensity. The first operational amplifier heats up and generates drift when measuring light beams of from medium intensity to high intensity, but the measurement results of light beams of low intensity are not affected by drift because measurement is carried out by means of the second operational amplifier. This device therefore enables accurate measurement of the amount of light of light beams of low intensity.

The above and other objects, features, and advantages of the present invention will become apparent from the following description with reference to the accompanying drawings, which illustrate examples of the present invention.

BRIEF DESCIPTIION OF THE DRAWINGS

DETAILED DESCRIPTION OF THE PREFERRED EMBODIMENTS (First Embodiment)

Figure 8:
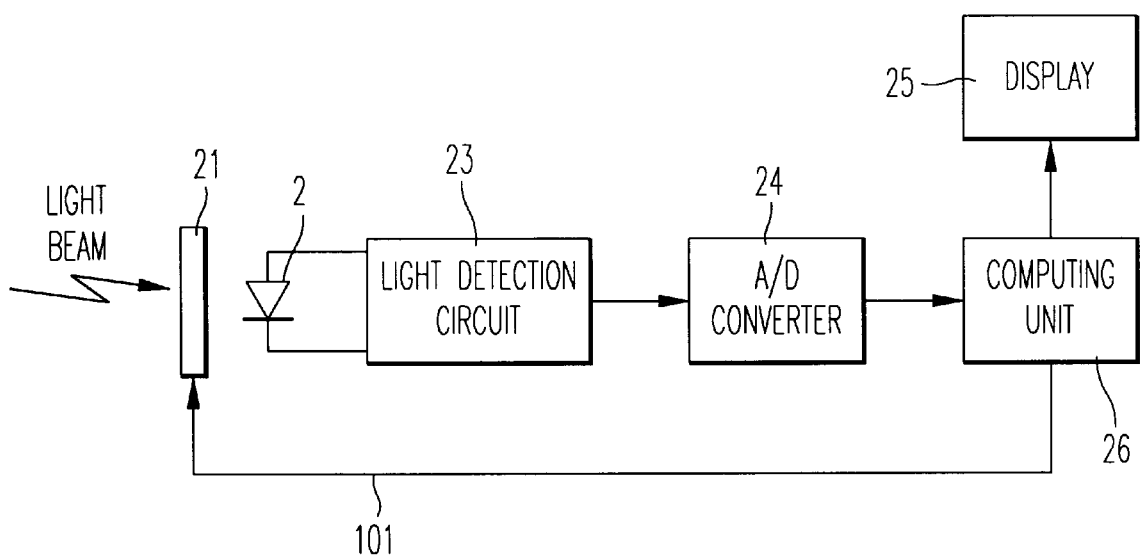
FIG. 8 is a block diagram showing the configuration of a light-measuring device according to the first embodiment of the present invention.

The light-measuring device according to the first embodiment of the present invention will first be explained with reference to FIG. 8. Reference numerals identical to those used in FIG. 1 indicate equivalent constituent elements.

Figure 1:
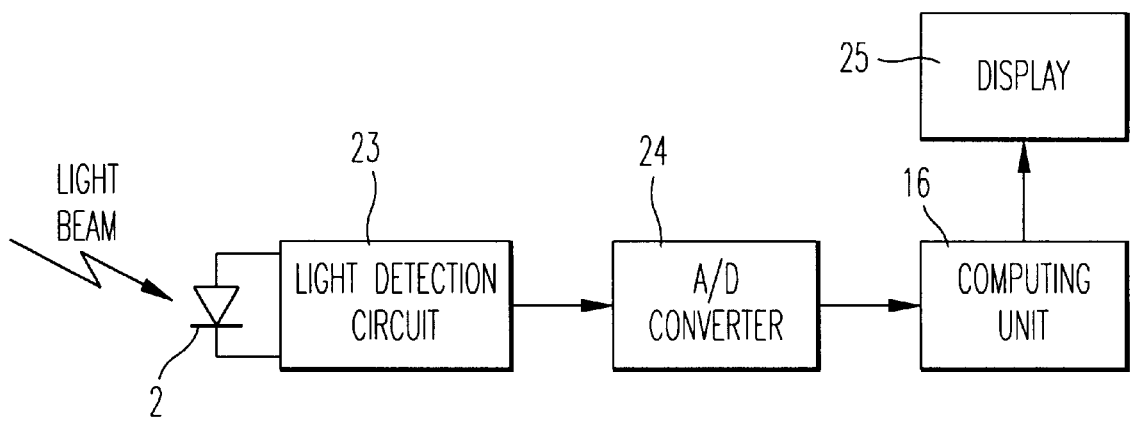
FIG. 1 is a block diagram showing the configuration of a light-measuring device of the prior art.
Figure 2:
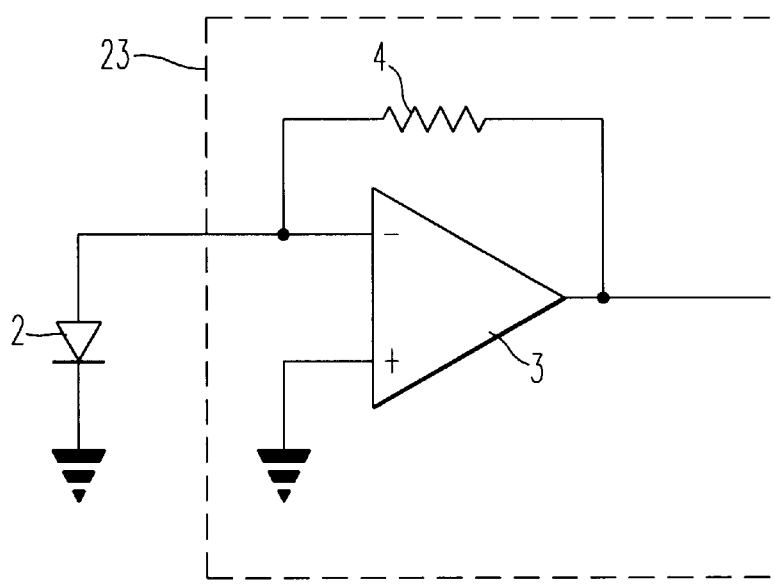
FIG. 2 is a circuit diagram of the portions connected to photodiode 2 in light detecting circuit 23.

The light-measuring device of this embodiment differs from the prior-art light-measuring device of FIG. 1, in that the former is provided with optical shutter 21, which blocks light incident to photodiode 2 when optical shutter control signal 101 is inputted, and computing unit 26 in place of computing unit 16 shown in FIG. 1.

In addition to the functions of computing unit 16, computing unit 26 has a function to output optical shutter control signal 101 if the measurement signal outputted from A/D converter 24 equals or exceeds a predetermined prescribed value and turns off optical shutter 21, thereby cutting off light to be inputted to photodiode 2.

The actual construction of optical shutter 21 will be next described with reference to FIG. 9a and FIG. 9b.

This optical shutter 21 consists of: a solenoid 92 that pulls in a core 93 when optical shutter control signal 101 is outputted and power is supplied; a spring 90 having one end connected to core 93 that applies force in the direction of extraction of core 93 from solenoid 92; and a blocking member 94 for interrupting the light path of light inputted to photodiode 2, having one end connected to core 93, and provided with fulcrum 91 near its center.

Figure 9A:
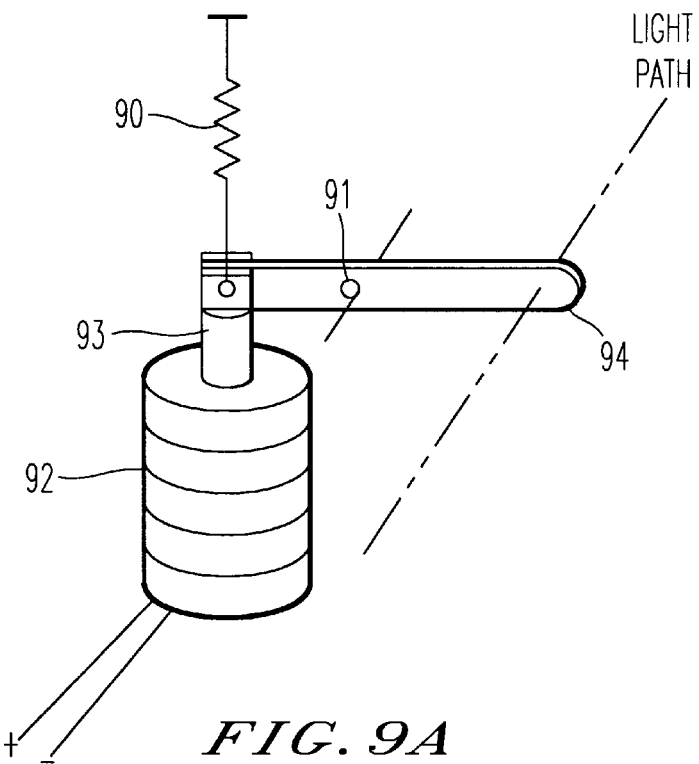
FIG. 9a and FIG. 9b show the actual configuration of optical shutter 1 in FIG. 8.
Figure 9B:
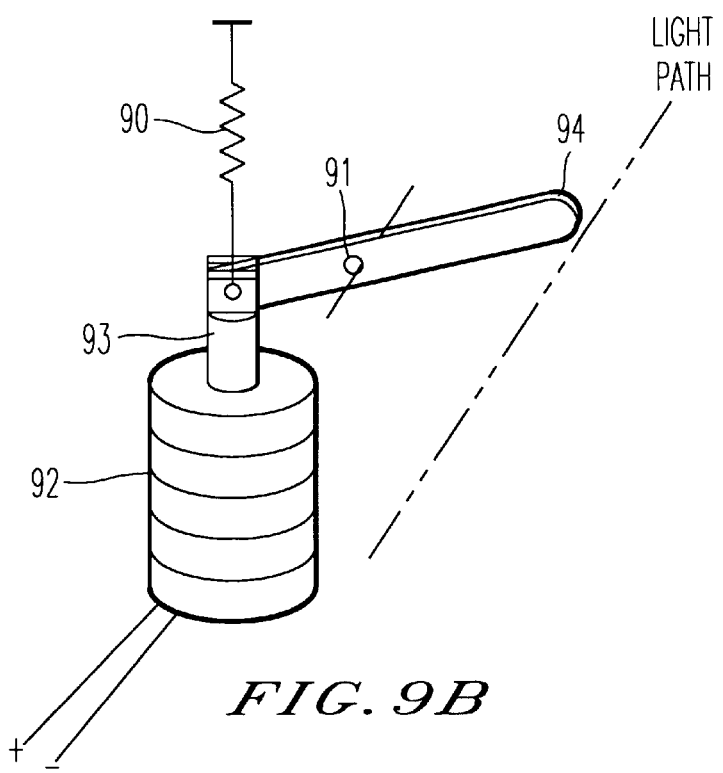

When power is not supplied to solenoid 92, core 93 protrudes from solenoid 92 under the force of spring 90 as shown in FIG. 9a, and blocking member 94 cuts off the light path. When power is supplied to solenoid 92, core 93 is pulled into solenoid 92 and blocking member 94 rotates around fulcrum 91 as shown in FIG. 9b, whereby optical shutter 21 enters a state in which the light path is not blocked.

The operation of this embodiment will be next explained with reference to FIG. 8, FIG. 9a and FIG. 9b.

In a case in which light equal to or exceeding the rated value is inputted to photodiode 2, computing unit 26 outputs optical shutter control signal 101 in accordance with measurement data inputted by way of light detection circuit 23 and A/D converter 24 such that optical shutter 21 is turned off. As a result, optical shutter 21 enters an off state and light inputted to photodiode 2 is blocked.

Computing unit 26 then maintains this state until measurement data from A/D converter 24 falls below the set prescribed value, until passage of a set time interval, or until it is reset from the outside.

If the power source of the light-measuring device turns off in this state, optical shutter control signal 101 is no longer outputted, and optical shutter 21 therefore turns off automatically and enters the state of FIG. 9a, thereby cutting off the light inputted to photodiode 2. Photodiode 2 thus can be protected from damage even in cases in which power is interrupted and computing unit 26 does not operate.

(Second Embodiment)

Explanation will be next presented regarding the light-measuring device according to the second embodiment of the present invention.

The light-measuring device of this embodiment detects drift in the offset voltage of the operational amplifier that is measured while the optical shutter is turned off, produces an approximation equation that predicts change in subsequent offset voltage based on this rate of change, subtracts the amount of offset predicted by this approximation equation from the measured data, and displays the result.

Such approximation equations are represented by:

$$Y = kt + A \quad (t \geq t_1) \qquad (1)$$

$$Y = B \quad (t < t_1) \qquad (2)$$

Where Y indicates the offset voltage of the operational amplifier, t indicates the measurement interval, A and k indicate coefficients determined by drift, and B indicates the offset voltage when drift has stabilized.

Figure 10:
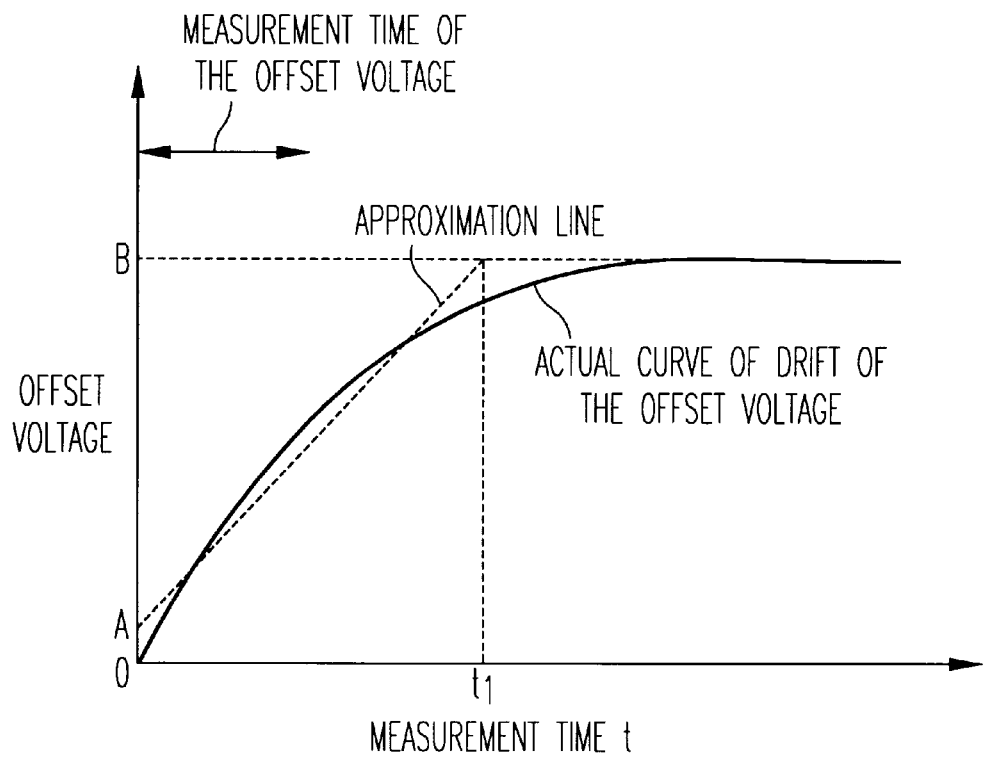
FIG. 10 shows the approximation line that uses a linear function approximation equation and the actual drift curve of offset voltage of the operational amplifier in a light-measuring device according to the second embodiment of the present invention.

FIG. 10 shows the approximation line obtained using this linear function approximation equation and the actual curve of drift of the offset voltage of the operational amplifier. In this graph, the solid line indicates the curve of drift of the offset voltage of the operational amplifier, and the broken line indicates the approximation line.

Figure 11A:
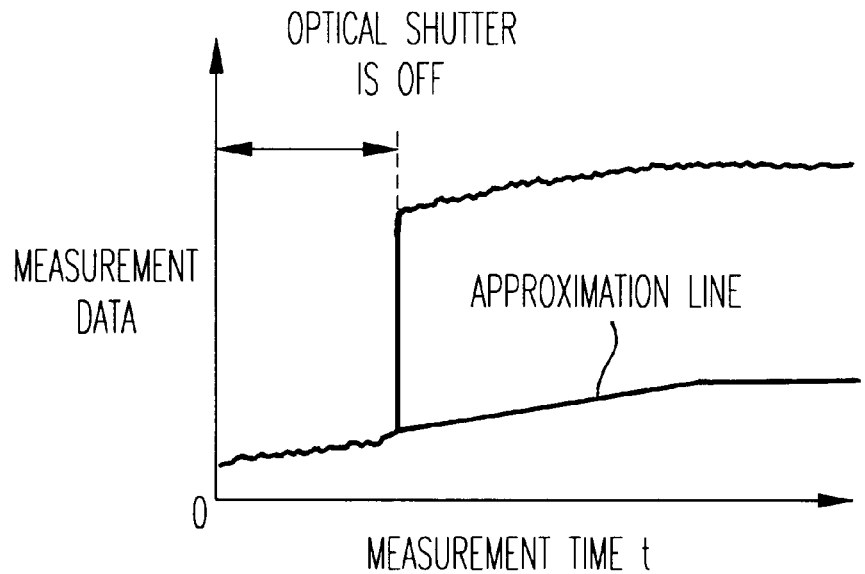
FIG. 11a shows measurement data before subtracting offset voltage.
Figure 11B:
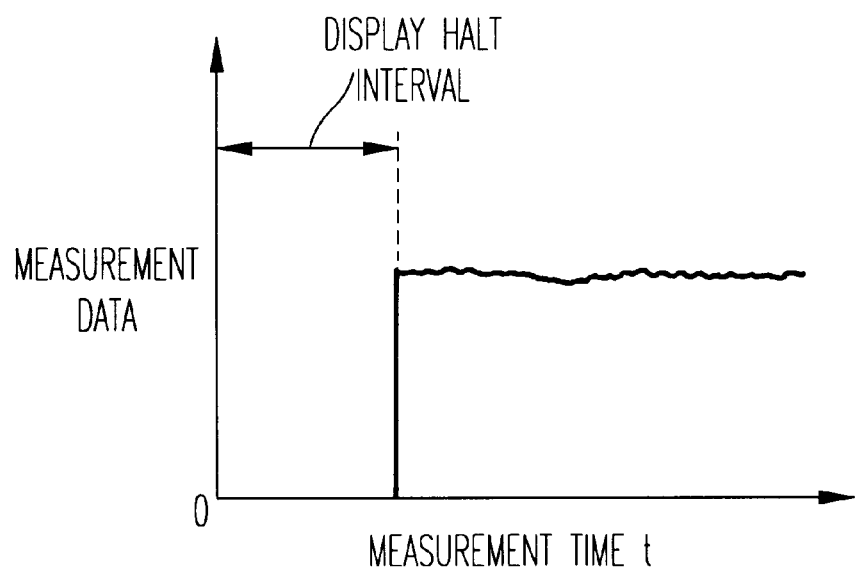
FIG. 11b shows measurement data after subtracting the offset voltage.

FIG. 11a and FIG. 11b show measurement data of light intensity for a case in which measurement is carried out using these approximation equations. FIG. 11a shows measurement data before subtracting the offset voltage, while FIG. 11b shows measurement data after subtracting offset voltage.

Figure 5A:
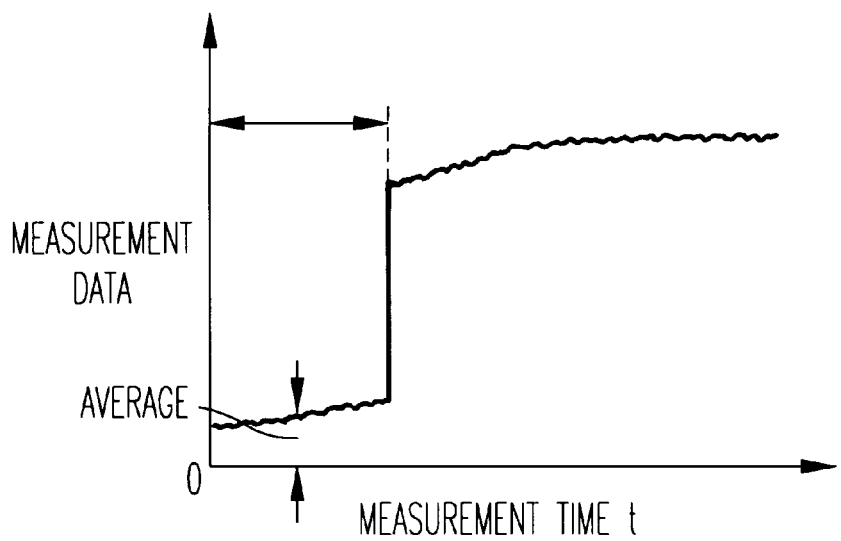
FIG. 5a shows measurement data before subtracting the offset voltage portion.
Figure 5B:
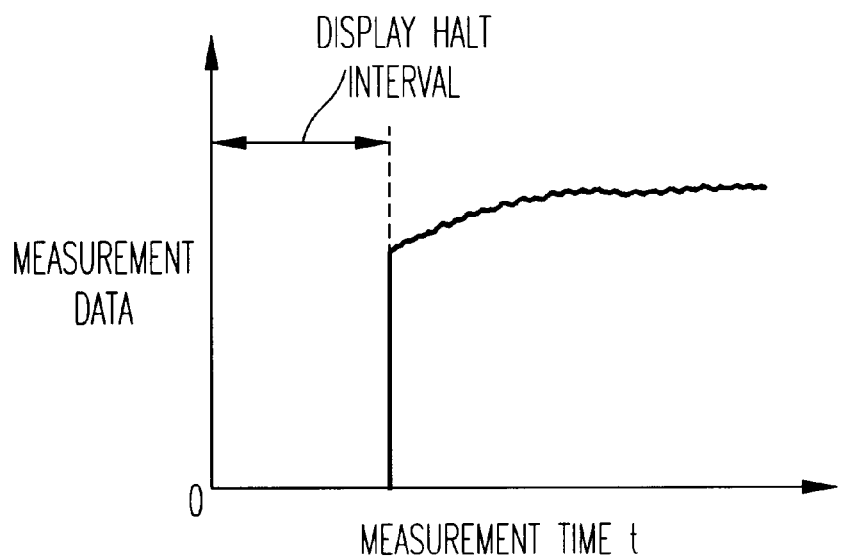
FIG. 5b shows measurement data after subtracting the offset voltage portion (in cases of temperature drift)

Comparison of the measurement data of FIG. 5b for a case in which the light-measuring device of the prior art is used with the graph of FIG. 11b for a case in which the light-measuring device of the present embodiment is used shows a reduction in the contained error.

(Third Embodiment)

Explanation will be next presented regarding the light-measuring device according to the third embodiment of the present invention. While the amount of drift was approximated using a linear function in the above-described second embodiment, this embodiment approximates the amount of drift using an exponential function represented by:

$$Y = C(1 - e^{-kt}) \qquad (3)$$

Were, Y indicates the offset voltage of operational amplifier, t indicates the measurement interval, and C and k indicate coefficients determined by drift.

Although the approximation equation of this embodiment is more complex than that of the above-described second embodiment, it enables a closer approximation of the actual drift in offset voltage of the operational amplifier and enables a further reduction in the error contained within the measured data.

Although the drift in offset voltage is approximated using a linear function in the second embodiment described hereinabove and using an exponential function in the above-described third embodiment, the present invention is not limited to these forms and allows approximation of drift using other numerical formulas.

(Fourth Embodiment)

Figure 12:
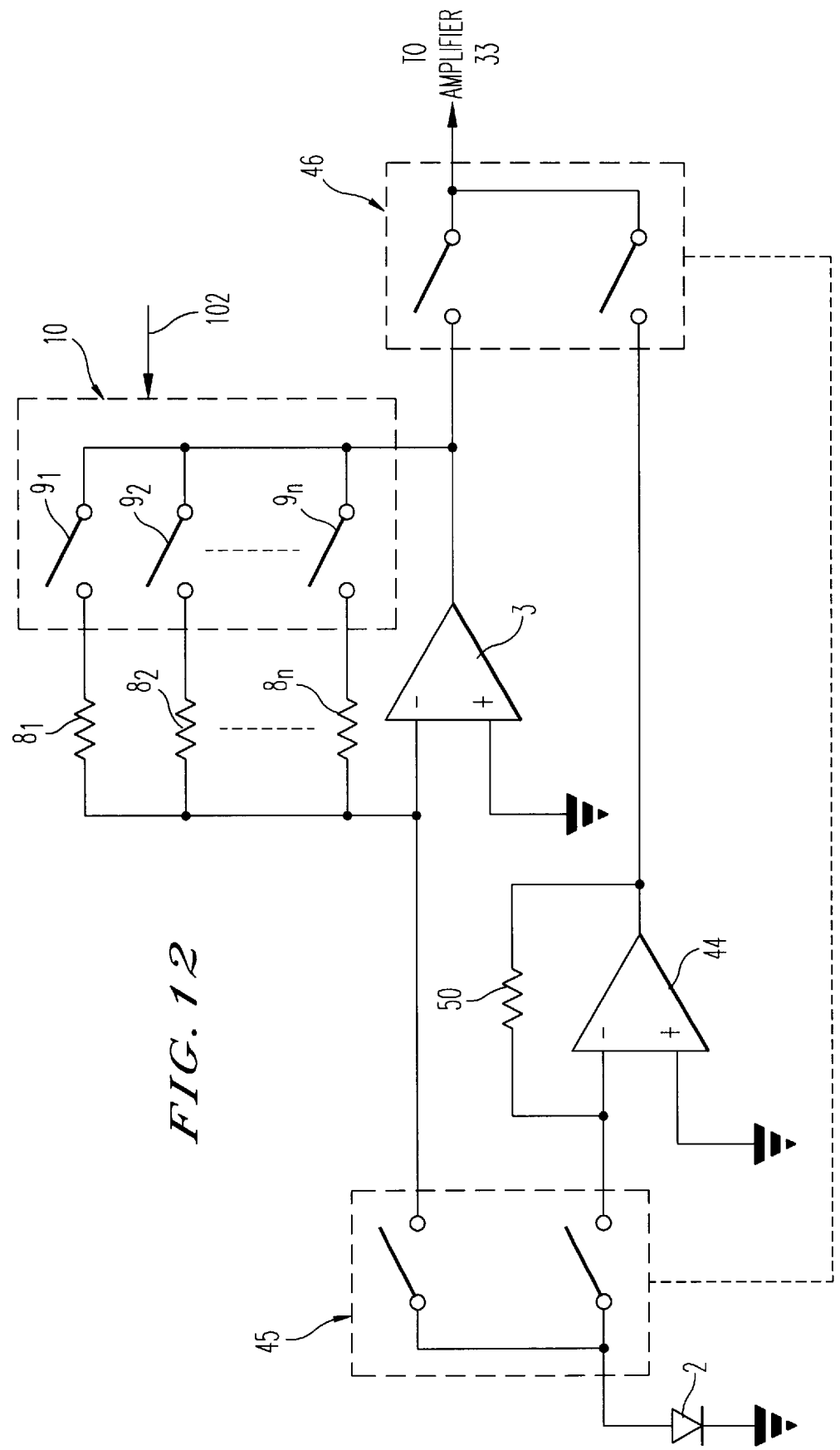
FIG. 12 is a block diagram showing the configuration of a light-measuring device according to the fourth embodiment of the present invention.

Explanation will be next presented regarding the light-measuring device according to the fourth embodiment of the present invention with reference to FIG. 12.

Figure 3:
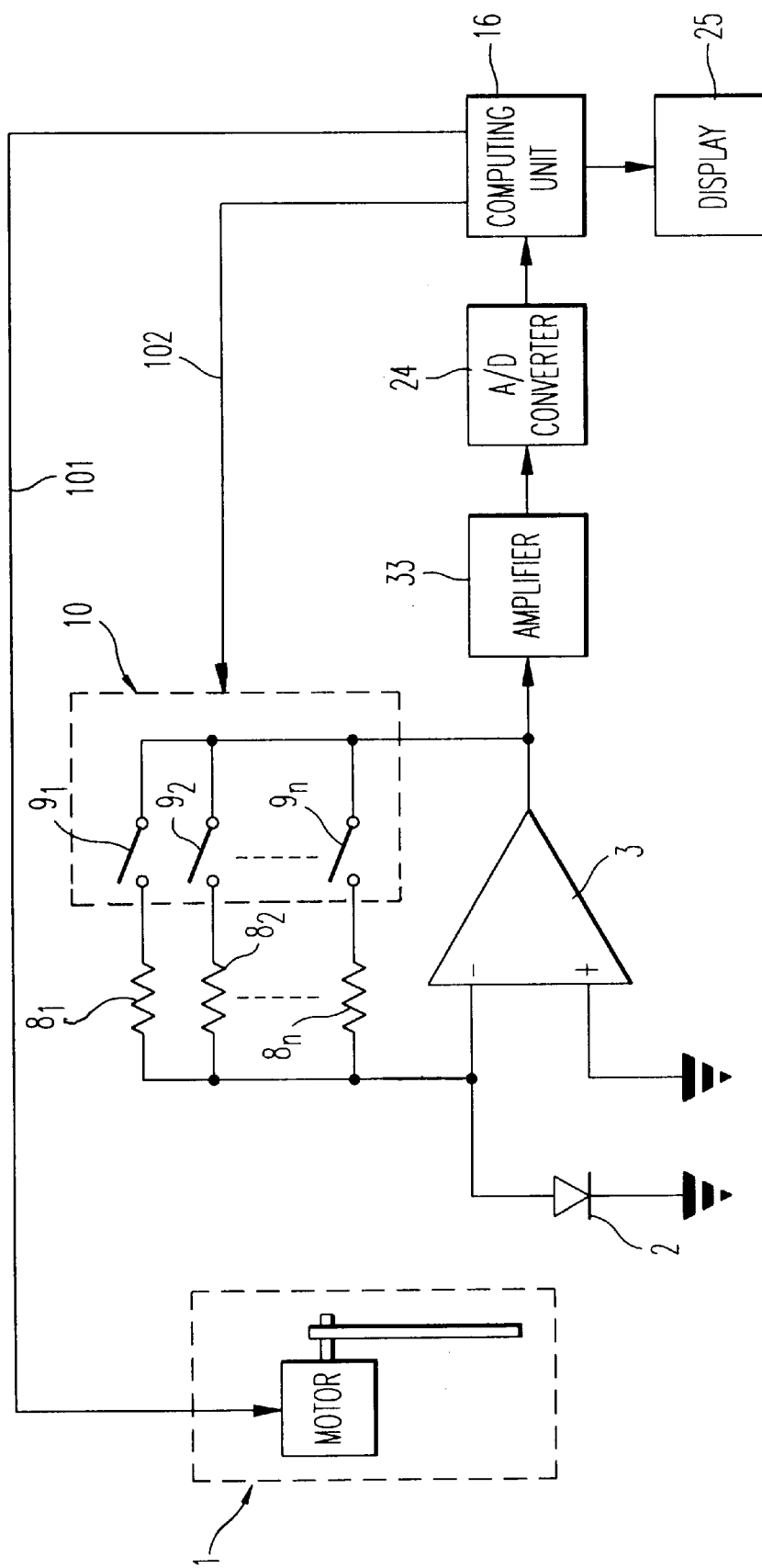
FIG. 3 is a block diagram showing the configuration of a light-measuring device of the prior art that is capable of switching the gain of operational amplifier 3.
Figure 4A:
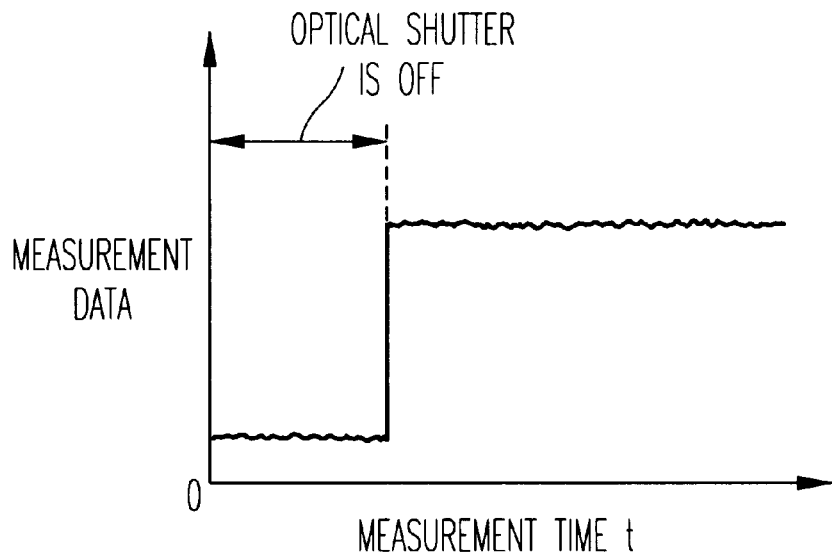
FIG. 4a shows measurement data before subtracting the offset voltage portion.
Figure 4B:
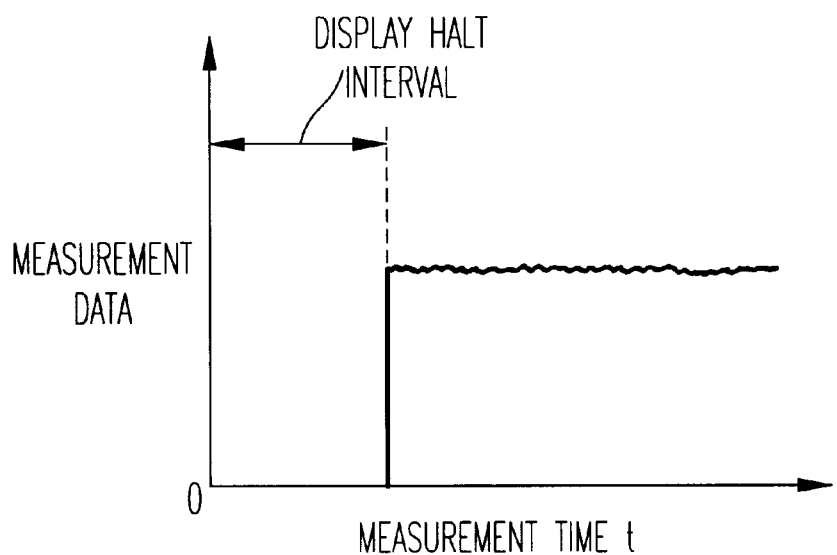
FIG. 4b shows measurement data after subtracting the offset voltage portion (in cases of no temperature drift)

The light-measuring device of this embodiment differs from the light-measuring device of the prior art shown in FIG. 3, in that the former is additionally provided with an operational amplifier 44, a feedback resistor 50, an amplifier switch 45, and an output switch 46.

Output switch 46 selects the output of either operational amplifier 3 or operational amplifier 44 and outputs to amplifier section 33.

Amplifier switch 45 selects either the inverting input terminal of operational amplifier 3 or the inverting input terminal of operational amplifier 44 and connects the input terminal of photodiode 2 to the selected inverting terminal. In addition, the selected state of amplifier switch 45 is associated with output switch 46.

Connected to operational amplifier 44 is a feedback resistor 50 with a greater resistance than any of resistors $8_1$–$8_n$.

When measuring the amount of light beams of from high intensity to medium intensity with the light-measuring device of this embodiment, operational amplifier 3 is connected to photodiode 2 by means of amplifier switch 45, and operational amplifier 3 is connected to amplifier section 33 by means of output switch 46.

In this state, the generated current of photodiode 42 is amplified appropriately by first operational amplifier 43 by switching feedback resistors $8_1$–$8_n$ of operational amplifier 3 based on the intensity of the light beam, and the amount of light of light beams of from high intensity to medium intensity can be effectively measured.

When measuring the amount of light in a light beam with low intensity, however, operational amplifier 44 is connected to photodiode 2 by means of amplifier switch 45, and operational amplifier 44 is connected to amplifier section 33 by means of output switch 46.

As explained above, operational amplifier 44 is connected to feedback resistor 50, which has a resistance higher than any of feedback resistors $8_1$–$8_n$ of operational amplifier 3. Operational amplifier 44 can thus amplify the signal generated by photodiode 2 by a large amplification factor, whereby a large S/N ratio can be maintained and the amount of light in a light beam with low intensity can be effectively measured.

The light-measuring device of this embodiment uses operational amplifier 3 in the same manner as in the prior art in the case of light beams of medium intensity to high intensity, and employs operational amplifier 44 only for light beams of low intensity.

When measuring light beams with medium intensity to high intensity, operational amplifier 3 heats up and gives rise to drift, but measurement of light beams with low intensity is carried out by operational amplifier 44, and drift due to heat generation therefore does not effect the measurement results. In this way, the accurate measurement of the amount of light is enabled for light beams with low intensity.

In the light-measuring device of this embodiment, moreover, when connections between photodiode 2 and operational amplifiers 3 and 44 are switched by means of amplifier switch 45, connections between operational amplifiers 3 and 44 and amplifier section 33 are also switched in unison by means of output switch 46. Therefore, the selected output voltage of the output voltages of operational amplifiers 3 and 44 does not leak to the other unselected output voltage.

Although an example was presented in which two operational amplifiers 3 and 44 are provided for one photodiode 2 in the above-described embodiment, three or more operational amplifiers may also be employed.

Finally, in the light-measuring device of this embodiment, the polarity of photodiode 2 may also be reversed.

(Fifth Embodiment)

Figure 13:
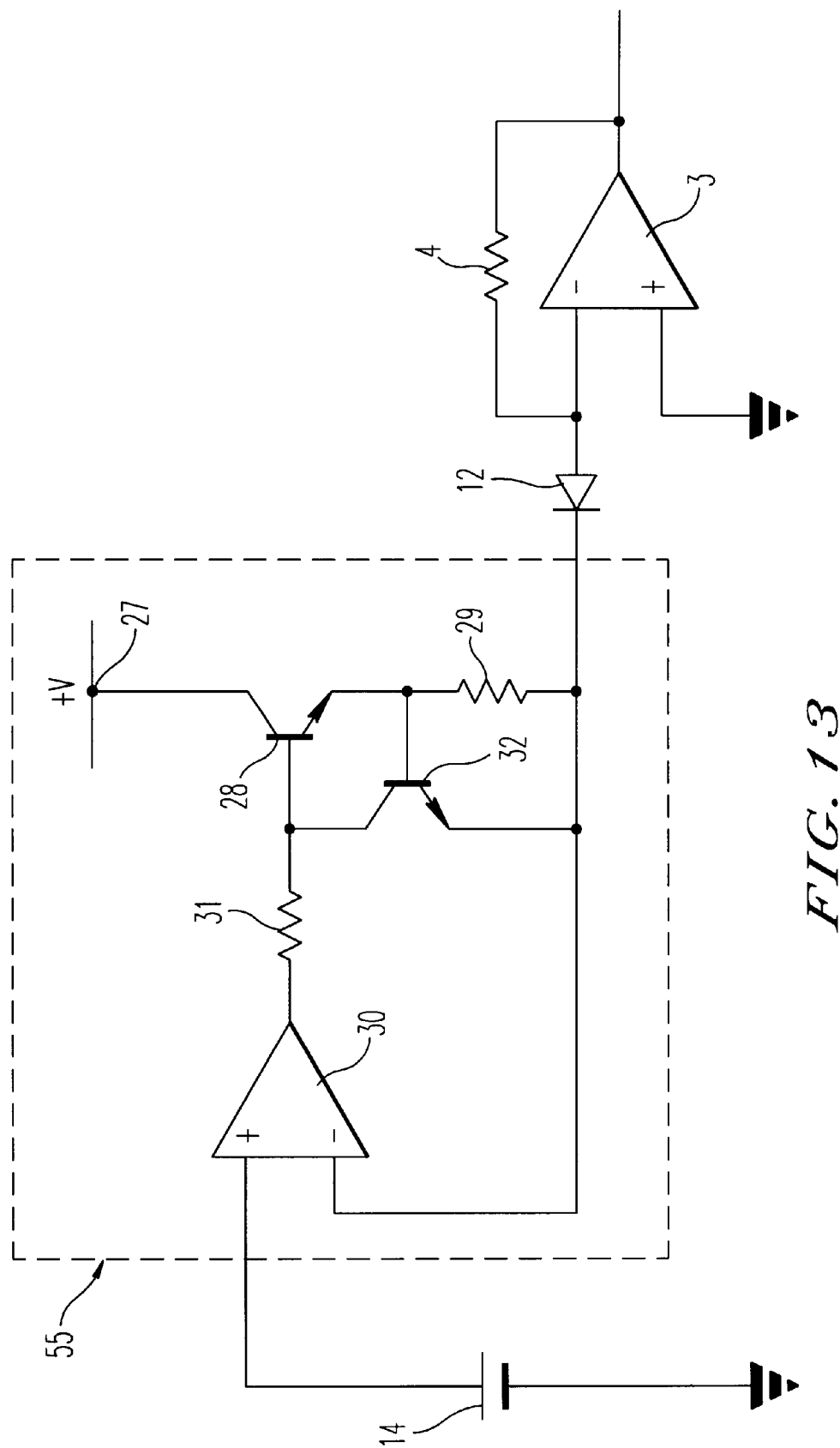
FIG. 13 is a block diagram showing the configuration of a light-measuring device according to the fifth embodiment of the present invention.

Explanation will be next presented regarding the fifth embodiment of the present invention with reference to FIG. 13. Reference numerals identical to those in FIG. 6 indicate equivalent constituent elements.

Figure 6:
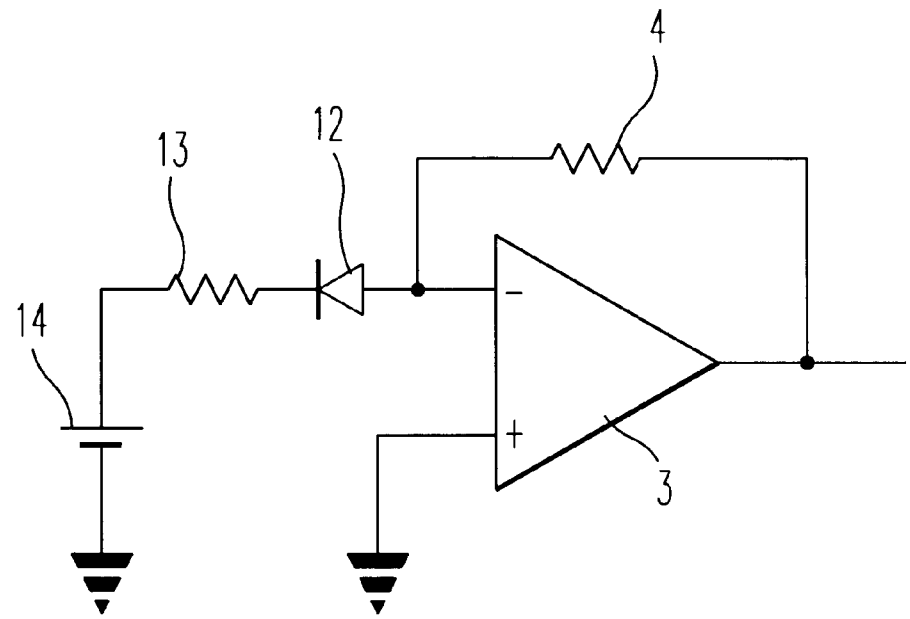
FIG. 6 is a circuit diagram showing the principle components of a light-measuring device of the prior art that employs photodiode 12 having a saturation characteristic.
Figure 7:
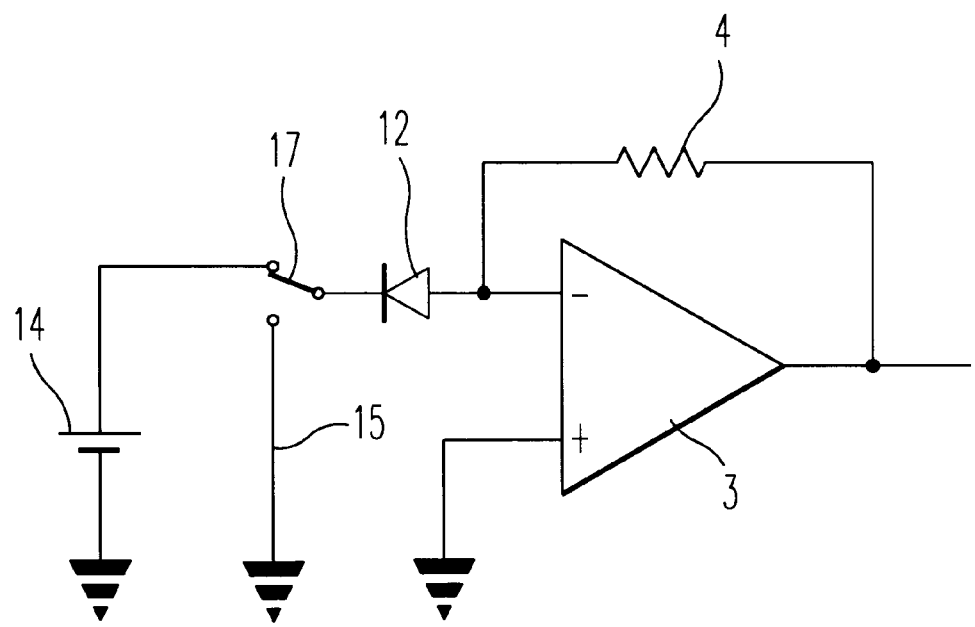
FIG. 7 is a circuit diagram showing the principle components of another light-measuring device of the prior art that employs photodiode 12 having a saturation characteristic.

The light-measuring device of this embodiment also has photodiode 12 with a saturation characteristic as in the light-measuring device of the prior art shown in FIG. 6. The light-measuring device of this embodiment differs from the light-measuring device of the prior art shown in FIG. 6, in that the former is additionally provided with a diode protection circuit 55 in place of resistor 13.

In diode protection circuit 55, power source 27 (+V) is connected to the output terminal of photodiode 12 by way of transistor 28 and current-detecting resistor 29, and the output terminal of photodiode 12 is connected to the inverting input terminal of operational amplifier 30.

Bias power source 14 is connected to the non-inverting input terminal of this operational amplifier 30, and the output terminal of this operational amplifier 30 is connected to the base electrode of transistor 28 and the collector electrode of transistor 32 by way of resistor 31. The emitter electrode of transistor 32 is connected to the output terminal of photodiode 12, and the base electrode of transistor 32 is connected to the emitter electrode of transistor 28.

Operational amplifier 30 maintains the output voltage of photodiode 12 at the same level as the bias voltage of bias power source 14, transistor 28 energizes photodiode 12 with a current corresponding to the output voltage of operational amplifier 30, and current-detecting resistor 29 converts the current energizing transistor 28 and photodiode 12 to voltage and applies this voltage to the base electrode of transistor 32.

Transistor 32 changes from an off state to on state and short-circuits resistor 31 to the inverting input terminal of operational amplifier 30, when the generated voltage of current-detecting resistor 29 has reached a predetermined voltage limit thereby suppressing the current that energizes transistor 28 and photodiode 12 to the current limit or lower.

In the above-described configuration, the light-measuring device of the present embodiment generates current corresponding to the amount of light incident to this photodiode 12 when a light beam to be measured is incident to photodiode 12. This current is amplified and outputted by operational amplifier 3, thereby allowing measurement of the amount of light from this output.

Photodiode 12 which has a saturation characteristic, generates current corresponding to the amount of light of a light beam, has an improved saturation characteristic because a bias voltage with polarity opposite to the current generated in photodiode 12 is applied by bias power source 14.

In a case in which the rated current allowed by photodiode 12 is converted to voltage by current-detecting resistor 29, transistor 32 is changed by this voltage from an off to an on state, whereby a limit current corresponding to the rated current photodiode 12 is set in diode protection circuit 55, and diode protection circuit 55 controls the current that energizes photodiode 12 so as to the limit current or lower.

Figure 14:
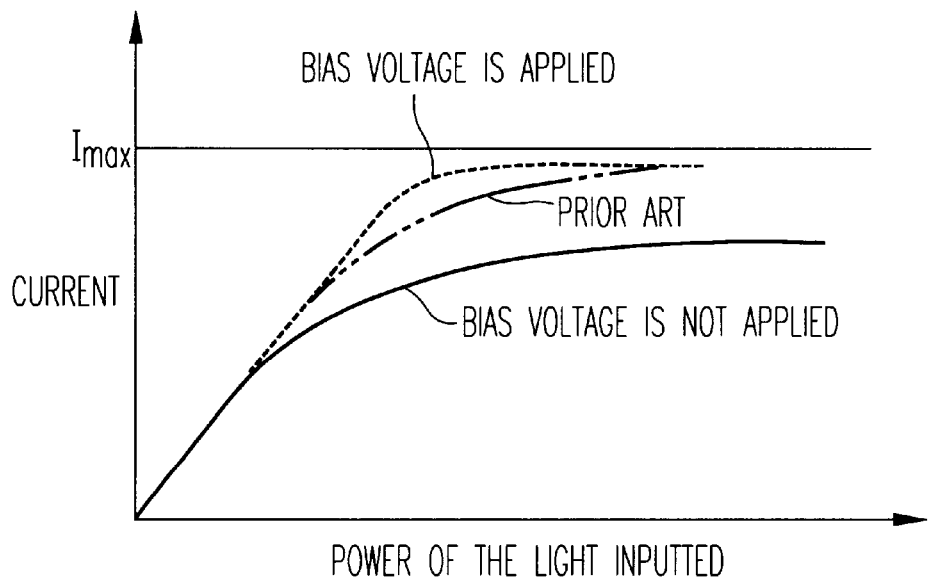
FIG. 14 is a graph showing the relation between the amount of light incident to photodiode 12 and the energizing current.

The current that energizes photodiode 12 is thus maintained at or below the limit current, as shown in FIG. 14, a current greatly exceeding the rated current is not allowed to pass on to photodiode 12 and breakdown of photodiode 12 can be prevented even in cases in which a light beam having an excessive amount of light is introduced.

Moreover, when the current that energizes photodiode 12 reaches the rated current, the application of bias voltage is also limited, thereby affording still further protection against breakdown of photodiode 12. Since bias voltage is applied to photodiode 12 until the energizing current reaches the rated current, the linearity of the characteristic of photodiode 12 is greatly improved while in the light-measuring state.

In addition, the above-described embodiment exhibits improved characteristics because bias voltage is applied by bias power source 14 to photodiode 12, which has a saturation characteristic.

This bias power source 14 may also be omitted such that no bias voltage is applied to photodiode 12. As shown in FIG. 14, the linearity of the characteristic of photodiode 12 is degraded ill such a case, but diode protection circuit 55 still suppresses the energizing current of photodiode 12 to the limit current or below.

(Sixth Embodiment)

Figure 15:
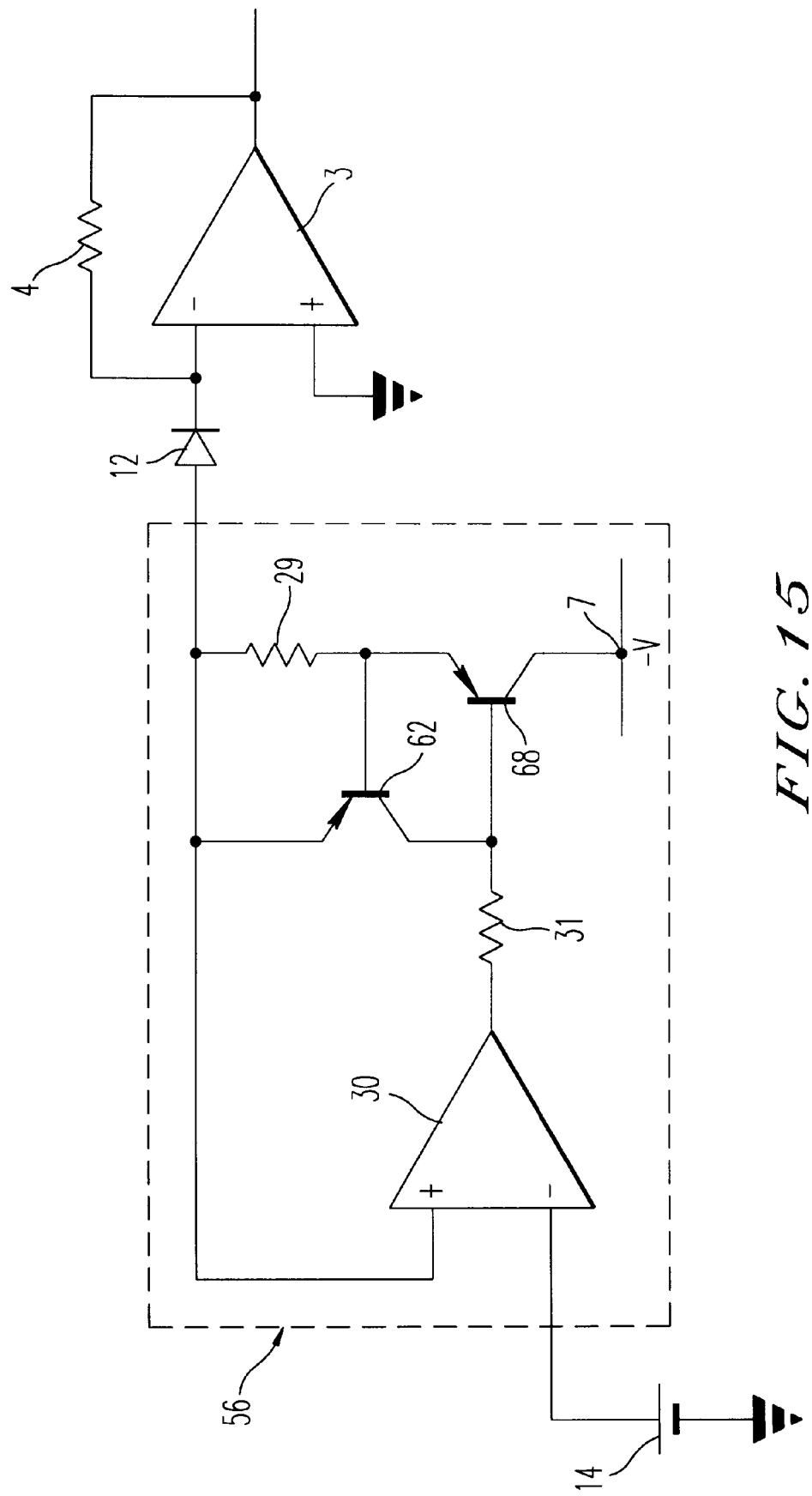
FIG. 15 is a block diagram showing the configuration of a light-measuring device according to the sixth embodiment of the present invention.

Explanation will be next presented regarding the light-measuring device according to the sixth embodiment of the present invention with reference to FIG. 15.

In the above-described fifth embodiment, an example was presented in which operational amplifier 3 was connected to the input terminal of photodiode 12 and the result of detection of the amount of light was outputted by current with a negative polarity. In the light-measuring device of this embodiment, however, operational amplifier 3 is connected to the output terminal of photodiode 12 and the result of detection of the amount of light is outputted by current with a positive polarity.

In this embodiment, a diode protection circuit 56 is used in place of diode protection circuit 55 shown in FIG. 15. This diode protection circuit 56 differs from diode protection circuit 55, in that transistors 28 and 32, which were npn transistors, are replaced with transistors 68 and 62, which are pnp transistors, and power source 7 (−V) is applied to the collector electrode of transistor 68. The inverting input terminal of operational amplifier 30 is connected to bias power source 14, and the non-inverting input terminal is connected to the input terminal of photodiode 12.

(Seventh Embodiment)

Figure 16:
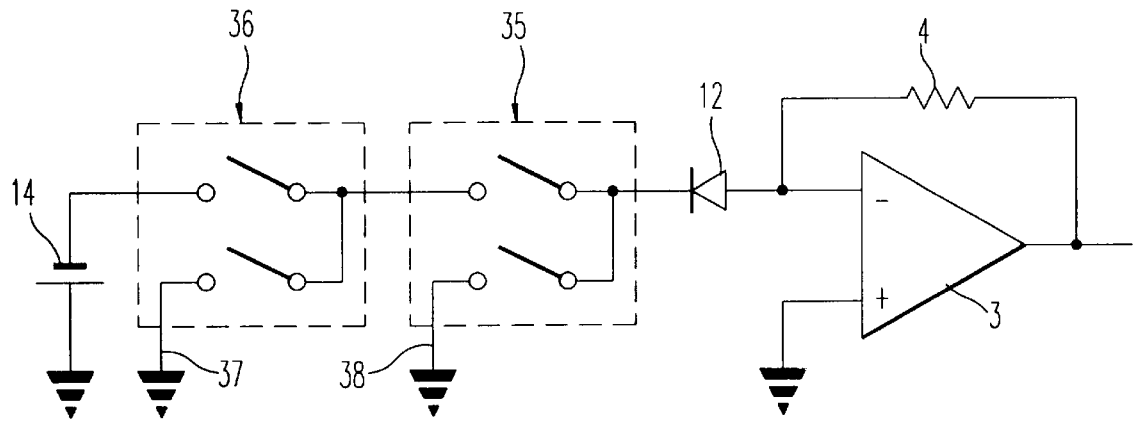
FIG. 16 is a block diagram showing the configuration of a light-measuring device according to the seventh embodiment of the present invention.

Explanation will be next presented regarding the light-measuring device according to the seventh embodiment of the present invention with reference to FIG. 16.

Figure 17:
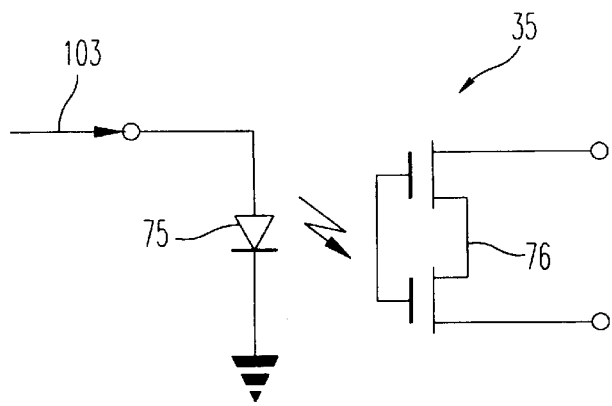
FIG. 17 is a circuit diagram showing the internal configuration of photo MOS relay 35 in FIG. 16.
Figure 18:
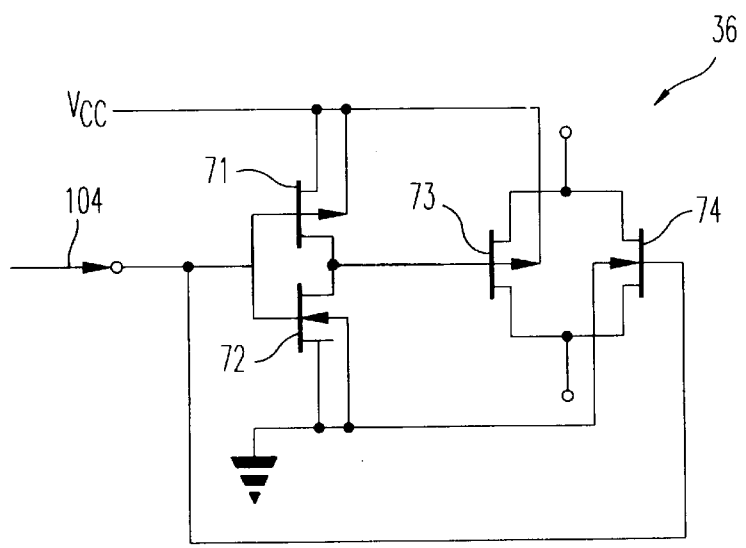
FIG. 18 is a circuit diagram showing the internal configuration of analog switch 36 in FIG. 16.

FIG. 17 is a circuit diagram showing the internal configuration of photo MOS relay 35 shown in FIG. 16, and FIG. 18 is a circuit diagram showing the internal configuration of analog switch 36 shown in FIG. 16.

The light-measuring device of this embodiment differs from the light-measuring device of the prior art shown in FIG. 6, in that the former is additionally provided with a photo MOS relay 35 and an analog switch 36 in place of resistor 13.

This photo MOS relay 35 selectively connects the output terminal of photodiode 12 to analog switch 36 or ground terminal 38. In addition, analog switch 36 selectively connects photo MOS relay 35 to bias power source 14 or ground terminal 37.

As shown in FIG. 17, photo MOS relay 35 is constituted by one type of photo coupler and consists of photodiode 75 and photo MOS transistor 76.

In this photo MOS relay 35, photodiode 75 turns on and outputs an optical signal when control signal 103 becomes high level. Photo MOS transistor 76 enters a conductive state by inputting this optical signal.

As shown in FIG. 18, analog switch 36 is consists four MOS transistors.

When control signal 104 becomes high level, MOS transistor 74 turns on and analog switch 36 enters a conductive state. Control signal 104 is then logically inverted by an inverter consisting of MOS transistors 71 and 72 and inputted to the gate electrode of MOS transistor 73. MOS transistor 73 therefore turns on in the same way as MOS transistor 74 and places analog switch 36 in a conductive state.

Although FIG. 17 and FIG. 18 each show constructions of only one pair of terminals, photo MOS relay 35 and analog switch 36 are actually constituted by two pairs of terminals.

Although, photo MOS relay 35 can turn the connection between bias power source 14 and photodiode 12 on and off with an extremely small amount of leakage current, this on/off operation requires a time interval of approximately 0.1 ms. In contrast, although analog switch 36 can turn the connection between bias power source 14 and photodiode 12 on and off at an extremely high speed of approximately 100 ns, it generates some leakage current even when the connection is in an off state.

A bias voltage with a polarity opposite to that of the generated current in photodiode 12 is applied by bias power source 14 in the light-measuring device of this embodiment, thereby allowing an improvement in the saturation characteristic of photodiode 12, which generates current based on the amount of light of a light beam, and enabling an improvement in the linearity of the measurement of the amount of light.

The light-measuring device of this embodiment, measures the amount of light of light beams with various intensities satisfactorily and continuously by turning on and off photo MOS relay 35 and analog switch 36 based on the intensity of the incident light beams. In concrete terms, the amount of light in a high-intensity light beam can be measured with excellent linearity by connecting bias power source 14 and photodiode 12 by analog switch 36 and photo MOS relay 35 when the light beam to be measured is of high intensity. When the light beam to be measured is of medium intensity, the connection between bias power source 14 and photodiode 12 is turned off at analog switch 36. In this case, the operation of this analog switch 36 is high speed, thereby enabling the accurate and continuous measurement of the amount of light of light beams of from high intensity to medium intensity. The occurrence of a certain amount of leakage current presents no problem because the measured light beam is not of low intensity. When the measured light beam is of low intensity, the connection between bias power source 14 and photodiode 12 is turned off by photo MOS relay 35. In this case, the amount of light of light beams of from medium intensity to low intensity can be accurately measured because the characteristic leakage current of photo MOS relay 35 is extremely limited. In particular, photo MOS relay 35 in an off state is connected to ground terminal 38, thereby allowing the bias voltage of photodiode 12 to be reliably set to "0" and enabling a more accurate measurement of the amount of light of a light beam.

Moreover, when the measured light beam is of medium intensity and analog switch 36 is set in an off state, photo MOS relay 35, which has low-speed operation, is set in an on state. When the measured light beam is of low intensity and photo MOS relay 35 is set in an off state, analog switch 36, which has high-speed operation, can be freely set to either an on or off state.

The light-measuring device of this embodiment is capable of measuring a light beam with high intensity with excellent linearity as well as continuously and accurately measuring light beams of from low intensity to high intensity because bias power source 14 is connected to photodiode 12 by means of photo MOS relay 35 having minimal leakage current and analog switch 36 having high-speed operation as described hereinabove.

The above-described embodiments presented cases in which the inverting input terminal of operational amplifier 3 was connected to the input terminal of photodiode 12 and the result of detection of the amount of light was outputted by current of negative polarity, but the non-inverting input terminal of operational amplifier 3 may be connected to the output terminal of photodiode 12 and the result of detection of the amount of light may be outputted by current of positive polarity.

In addition, the above-described embodiments presented cases in which photo MOS relay 35 having extremely limited leakage current and analog switch 36 having high-speed operation were provided between photodiode 12 and bias power source 14, but these characteristics are relative and these devices may be changed in accordance with the specifications of the light-measuring device.

For example, it is possible to provide between photodiode 12 and bias power source 14 both an analog switch as the switch element having high-speed operation and a mechanical relay as the switching element having extremely limited leakage current, or alternatively, a photo MOS relay as the switch element having high-speed operation and a mechanical relay as the switching element having extremely small leakage current. Examples of the characteristics of these switching elements are shown in Table 1 below.

TABLE 1

|  | Leakage current | Switching time |
| --- | --- | --- |
| Analog switch | Δ | ◎ (100 ns) |
| Photo MOS relay | ○ | ○ (0.1 ms) |
| Mechanical relay | ◎ | X (10 ms) |

Where, concerning about leakage current, "◎" means very less leakage current, "○" means less leakage current, "Δ" means normal leakage current. Concerning about switching time, "◎" means very short switching time, "○" means short switching time, "×" means long switching time.

In addition, although the above-described embodiments presented cases in which one fixed resistance element was used as feedback resistor 4, it is also possible to vary the gain of operational amplifier 3 using a plurality of resistors $8_1$–$8_n$ and switches $9_1$–$9_n$ such as shown in FIG. 12.

Finally, although explanation was presented using an optical power meter that measures the intensity of light and displays the result in the first to sixth embodiments described hereinabove, the present invention is not thus limited and may be applied to other light-measuring devices that detect or measure light such as an optical spectrum analyzer.

While preferred embodiments of the present invention have been described using specific terms, such description is for illustrative purposes only, and it is to be understood that changes and variations may be made without departing from the spirit or scope of the following claims.

What is claimed is:

1. A light-measuring device comprising:
    light quantity detecting means for receiving a light beam to be measured and generating a signal based on the intensity of said light beam;
    an optical shutter for blocking or letting pass light that is inputted to said light quantity detecting means;
    an operational amplifier for amplifying the signal supplied from said light quantity detecting means;
    an A/D converting means for A/D converting the signal amplified by said operational amplifier and outputting the result as measurement data;
    computing means for measuring the rate of change of offset voltage of said operational amplifier when light inputted to said light quantity detecting means is blocked by said optical shutter, producing an approximation equation that approximates change of offset voltage with respect to time based on said rate of change, subtracting the offset voltage calculated by means of said approximation equation from said measurement data, and outputting the obtained result as new measurement data.

2. A light-measuring device according to claim 1 wherein said light quantity detecting means is a photodiode.

3. A light-measuring device according to claim 1 wherein said approximation equation is a linear function.

4. A light-measuring device according to claim 1 wherein said approximation equation is an exponential function.

5. A light-measuring device comprising:
    a photodiode for receiving a light beam to be measured and generating a signal depending on the intensity of said light beam;
    an operational amplifier for amplifying the signal outputted from said photodiode;
    a bias power source for applying to said photodiode a bias voltage with a polarity opposite to that of the current generated by said photodiode; and
    a diode protection circuit for limiting the bias voltage supplied by said bias power source to said photodiode when current energizing said photodiode reaches a limit current that is set in advance, thus effecting control such that the current energizing said photodiode is equal to or lower than said limit current.

6. A light-measuring device according to claim 5 wherein said diode protection circuit comprises:
    a first operational amplifier for keeping the output voltage of said photodiode sonstant;
    a first transistor for energizing said photodiode with current corresponding to the output voltage of said first operational amplifier;
    a current-detecting resistor for detecting current energizing said first transistor and said photodiode; and
    a second transistor for limiting current that energizes said first transistor and said photodiode when the detected current of said current-detecting resistor has reached said limit current.

7. A light-measuring device according to claim 5 wherein said diode protection circuit comprises:
    a first operational amplifier for keeping the output voltage of said photodiode equal to the bias voltage of said bias power source;
    a first transistor for energizing said photodiode with current corresponding to the output voltage of said first operational amplifier;
    a current-detecting resistor for detecting current that energizes said first transistor and said photodiode; and
    a second transistor for limiting the current that energizes said first transistor and said photodiode when the detected current of said current-detecting resistor has reached said limit current.

8. A light-measuring device comprising:
    a photodiode for receiving a light beam to be measured and generating a signal based on the intensity of said light beam;
    an operational amplifier for amplifying the current generated by said photodiode;
    a bias power source for applying to said photodiode a bias voltage with a polarity opposite to that of the current generated by said photodiode;
    a first switching means for controlling connection/disconnection between said bias power source and said photodiode; and
    a second switching means for controlling connection/disconnection between said bias power source and said photodiode, said second switching means having slower switching speed than said first switching means, and having less leakage current than said first switching means.

9. A light-measuring device according to claim 8 wherein said first switching means is an analog switch and said second switching means is a photo MOS relay.

10. A light-measuring device according to claim 8 wherein said first switching means is an analog switch and said second switching means is a mechanical relay.

11. A light-measuring device according to claim 8 wherein said first switching means is a photo MOS relay and said second switching means is a mechanical relay.

12. A light-measuring device according to claim 8 wherein said first switching means and said second switching means ground said photodiode when said bias power source and said photodiode are placed in a disconnected state.

13. A light-measuring device according to claim 12 wherein said first switching means is an analog switch and said second switching means is a photo MOS relay.

14. A light-measuring device according to claim 12 wherein said first switching means is an analog switch and said second switching means is a mechanical relay.

15. A light-measuring device according to claim 12 wherein said first switching means is a photo MOS relay and said second switching means is a mechanical relay.

16. A light-measuring device comprising:
    a photodiode for receiving a light beam to be measured and generating a signal based on the intensity of said light beam;
    a first operational amplifier for amplifying the signal generated by said photodiode;
    a second operational amplifier for amplifying a signal generated by said photodiode;
    an amplifier switching means for outputting the signal generated by said photodiode to either said first operational amplifier or said second operational amplifier;
    a variable resistance interposed between the output terminal and the inverting input terminal of said first operational amplifier;
    a fixed resistance interposed between the output terminal and inverting input terminal of said second operational amplifier and having a resistance equal to or greater than the maximum resistance that can be set to said variable resistance; and
    output switching means for selecting the output signal of one of said first and second operational amplifiers.

17. A light-measuring device according to claim 16 wherein said variable resistance comprises:
    a plurality of fixed resistor elements having mutually different resistances; and
    switching means for selecting one of said plurality of fixed resistor elements and connects the output terminal and inverting input terminal of said first operational amplifier.

* * * * *